United States Patent [19]

Suyama et al.

[11] Patent Number: 4,673,999

[45] Date of Patent: Jun. 16, 1987

[54] MULTI CHANNEL MAGNETIC TRANSDUCER HEAD

[75] Inventors: Hideo Suyama; Shigeyoshi Imakoshi; Yutaka Soda, all of Kanagawa; Takeyuki Fuse, Miyagi; Iwao Abe, Miyagi; Noboru Wakabayashi, Miyagi, all of Japan

[73] Assignee: Sony Corporation, Tokyo, Japan

[21] Appl. No.: 643,544

[22] Filed: Aug. 23, 1984

[30] Foreign Application Priority Data

Aug. 29, 1983 [JP] Japan ............................ 58-157650

[51] Int. Cl.$^4$ .......................... G11B 5/127; G11B 5/29
[52] U.S. Cl. ................................ 360/125; 360/122; 360/121
[58] Field of Search ............... 360/127, 126, 125, 122, 360/119, 120, 121, 123; 29/603

[56] References Cited

U.S. PATENT DOCUMENTS

| | | | |
|---|---|---|---|
| 4,012,782 | 3/1977 | Lazzari | 360/121 X |
| 4,092,688 | 5/1978 | Nomura et al. | 360/121 |
| 4,246,620 | 1/1981 | Kaminaka et al. | 360/121 X |
| 4,577,250 | 3/1986 | Sato et al. | 360/121 X |

FOREIGN PATENT DOCUMENTS

| | | | |
|---|---|---|---|
| 0135321 | 10/1980 | Japan | 29/603 |
| 0078613 | 5/1982 | Japan | 360/122 |
| 0113410 | 7/1982 | Japan | 360/122 |
| 0038918 | 3/1984 | Japan | 29/603 |

Primary Examiner—Robert S. Tupper
Assistant Examiner—Andrew L. Sniezek
Attorney, Agent, or Firm—Hill, Van Santen, Steadman & Simpson

[57] ABSTRACT

A multi channel magnetic transducer head comprises a magnetic substrate, and a plurality of thin film type magnetic transducer head elements arranged on the magnetic substrate, each magnetic transducer head element including a coil conductor disposed on the magnetic substrate and a thin film magnetic core to constitute a magnetic circuit in co-operation with the substrate, wherein a non-magnetic gap spacer layer with a predetermined thickness is formed at track width portion below front end of the thin film magnetic core on the magnetic core, a non-magnetic layer with thickness larger than that of the gap spacer layer is formed at track spacing portion, the thin film magnetic core has width covering at least the gap spacer layer of the track width portion, thereby good magnetic recording can be performed.

1 Claim, 17 Drawing Figures

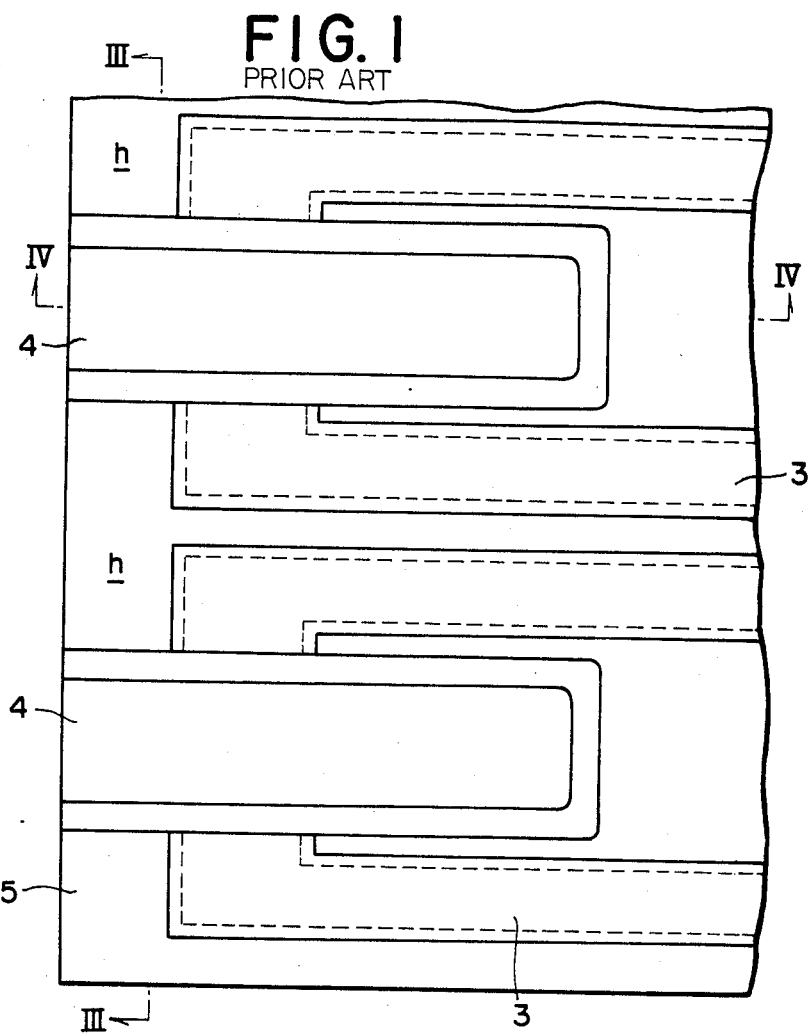
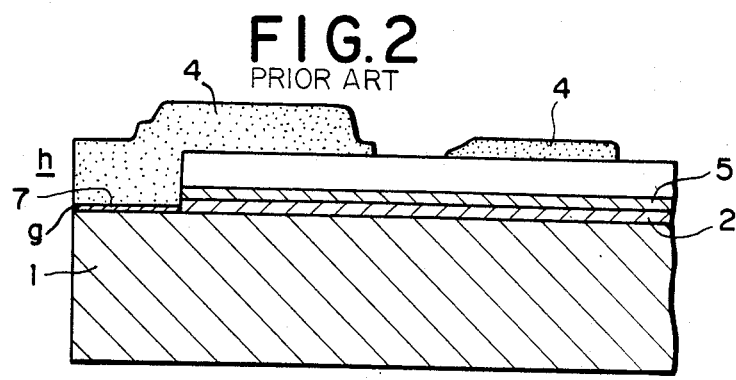

MULTI CHANNEL MAGNETIC TRANSDUCER HEAD

BACKGROUND OF THE INVENTION

1. Field of the Invention

The present invention relates to multi channel magnetic transducer heads, and more particularly to a thin film type magnetic transducer head manufactured using thin film forming technique.

2. Description of the Prior Art

Referring to FIGS. 1 through 4, a thin film type multi channel magnetic transducer head in the prior art, for example, that of electromagnetic induction type, comprises a magnetic substrate 1 made of magnetic ferrite, such as Mn-Zn ferrite or Ni-Zn ferrite, and a coil conductor 3 as a head winding formed on a main surface of the magnetic substrate 1 through an insulation film 2 of $SiO_2$ or $Si_3N_4$ with thickness 1 $\mu$m. The coil conductor 3 is formed by U-shaped conductive layer of Al, Cu or Au. Although the example discloses the coil conductor in one turn, constitution of several turns in spiral or constitution of several turns in multi layer structure may be used. An insulation film 5 of $SiO_2$ or $Si_3N_4$ with thickness 1 $\mu$m is formed on whole surface of the coil conductor 3, and a thin film magnetic core 4 crosses the coil conductor 3 through the insulation film 5 and front end of the thin film magnetic core 4 extends to a surface S faced to a magnetic recording medium. The thin film magnetic core 4 is formed by a magnetic thin film of sendust or permalloy having width 60 $\mu$m and thickness 10 $\mu$m. Rear end of the thin film magnetic core 4 passed through a window 6 bored on the insulation films 2 and 5 and is attached to the magnetic substrate 1 directly, for example, and magnetically connected to the substrate 1 in close connection. A non-magnetic gap spacer 7 with thickness 0.5 $\mu$m to constitute an effective magnetic gap g is formed between the front end of the thin film magnetic core 4 and the magnetic substrate 1. Thus a magnetic circuit is constituted which includes the magnetic gap g with gap length specified by thickness of the gap spacer layer 7 and forms a closed magnetic circuit in co-operation of the thin film magnetic core 4 and the magnetic substrate 1, and a magnetic head element h is provided with the coil conductor 3 crossing the magnetic circuit. A plurality of magnetic head elements h in such constitution are arranged at the predetermined number in common use of the magnetic substrate 1, and each magnetic gap g is faced to the common surface S facing to the magnetic recording medium at a predetermined track interval. Wherein FIG. 1 is a plan view of the head; FIG. 2 is a side view of FIG. 1; FIG. 3 is a sectional view taken in line III—III of FIG. 1; and FIG. 4 is a sectional view taken in line IV—IV of FIG. 1.

Process of manufacturing such a multi element thin film magnetic head will now be described. First, a magnetic substrate 1 is coated by an insulation film 2 as shown in FIG. 5. A coil conductor 3 is arranged on a predetermined position of the insulation film 2, and an insulation film 5 is applied to whole surface including that on the coil conductor 3 as shown in FIG. 6. Part of the insulation films 2 and 5, where a gap spacer layer 7 as hereinbefore described is to be formed, is selectively removed at a predetermined width along front side edge of the substrate 1, i.e. at width d corresponding to gap depth of the magnetic gap g to be formed finally, by etching using a photolithography as shown in a sectional view of FIG. 7 and a plan view of FIG. 8. The removed portion of the insulation films 2 and 5 is coated with a non-magnetic gap spacer layer 7 of a predetermined thickness, i.e. thickness corresponding to gap length of the magnetic gap g, such as thickness 0.5 $\mu$m as shown in FIG. 9. A window 6 is bored on the insulation films 2 and 5 and a magnetic thin film 4' of sendust or permalloy to constitute a magnetic core is formed on whole surface by means of sputtering as shown in FIG. 10. Unnecessary portion of the thin film 4' is removed by etching using a photolithography and the thin film magnetic core 4 of predetermined pattern is formed as shown in FIG. 11 and described referring to FIGS. 1 through 4.

In above described process, the thin film magnetic cores 4 regarding various tracks are formed simultaneously. In this case, since the magnetic core 4 hence the magnetic thin film 4' must have magnetic resistance of the magnetic circuit being as small as possible, thickness thereof is selected as large as possible, for example, to 10 $\mu$m. Therefore, during patterning of the magnetic thin film 4', i.e, etching using a photolithography, the etching progresses not only in thickness direction of the magnetic thin film 4' but also in surface direction. That is, so-called side etching is occured thereby edge of the pattern has trailing shape. As shown in FIG. 3 trailing portions a and b are produced on both sides of the magnetic gap g regarding the track width direction, thereby the track width of the magnetic gap g cannot be determined accurately but variation occurs. In the case of multi tracks, the etching is not performed well but the thin film magnetic cores 4 of various tracks may be magnetically connected with each other by thin layer of the magnetic film. Particularly, as the guard band width as the track spacing becomes narrow, this problem is accelerated. If the track width cannot be determined accurately, the high density recording as original object of the thin film magnetic transducer head cannot be attained but serious problem in characteristics may occur. Moreover, good magnetic recording cannot be performed.

SUMMARY OF THE INVENTION

It is an object of the present invention to provide an improved multi channel magnetic transducer head.

It is another object of the present invention to provide an improved thin film type multi channel magnetic transducer head having a plurality of magnetic transducer head elements.

It is further object of the present invention to provide a multi channel transducer head in which track width of each magnetic transducer head element can be precisely defined.

It is still further object of the present invention to provide a multi channel transducer head in which each magnetic transducer head element is magnetically separated to each other with a small distance therebetween.

According to one aspect of the present invention there is provided a multi channel magnetic transducer head comprising a magnetic substrate, and a plurality of magnetic cores formed on the substrate and aligned along one end of the substrate with effective magnetic gaps between the substrate and the plurality of magnetic cores at the one end of the substrate facing to a magnetic recording medium to form a plurality of magnetic transducer head elements, the effective magnetic gap being formed by providing a non-magnetic gap spacer having a predetermined thickness, the substrate being provided with non-magnetic layers between each of the magnetic cores at the one end of the substrate, the non-magnetic layers having a thickness larger than the non-magnetic gap spacer.

BRIEF DESCRIPTION OF THE DRAWINGS

FIG. 1 is a plan view of a multi channel thin film magnetic head in the prior art;

FIG. 2 is a side of the magnetic head in FIG. 1;

DESCRIPTION OF THE PREFERRED EMBODIMENT

A multi channel magnetic transducer head of the present invention comprises a magnetic substrate in common use, and a plurality of thin film type magnetic transducer head elements arranged on the magnetic substrate, wherein each magnetic transducer head element is composed of a coil conductor disposed on the magnetic substrate and a thin film magnetic core to constitute a magnetic circuit in co-operation with the magnetic substrate, a non-magnetic gap spacer layer with a predetermined thickness is formed at track width portion below front end of the thin film magnetic core on the magnetic core, a non-magnetic layer with thickness larger than that of the gap spacer layer is formed at each track spacing portion, the thin film magnetic core has width covering at least the gap spacer layer of the track width portion, thereby good magnetic recording can be performed.

Figure 3:
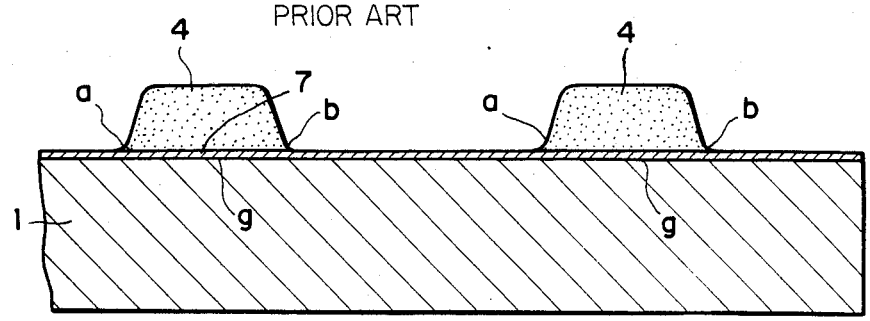
FIG. 3 is a sectional view taken in line III—III of FIG. 1.
Figure 4:
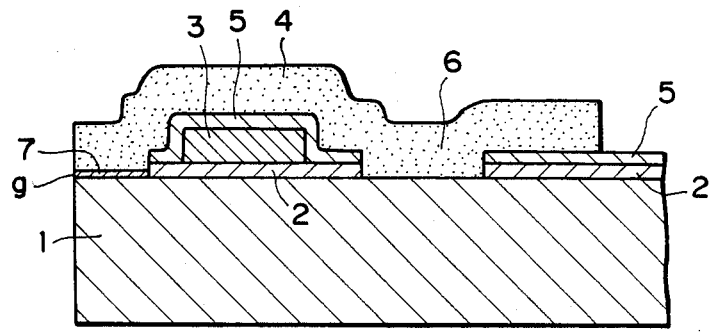
FIG. 4 is a sectional view taken in line IV—IV of FIG. 1.
Figure 5:
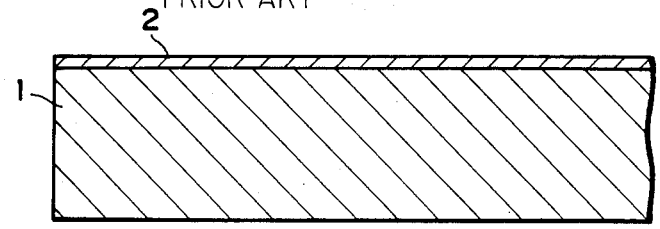
FIG. 5, FIG. 6, FIG. 7, FIG. 9, FIG. 10 and FIG. 11 are sectional views illustrating an example of manufacturing process of the magnetic head in FIG. 1.
Figure 6:
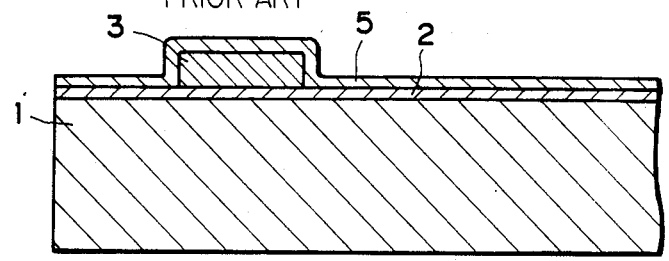
Figure 7:
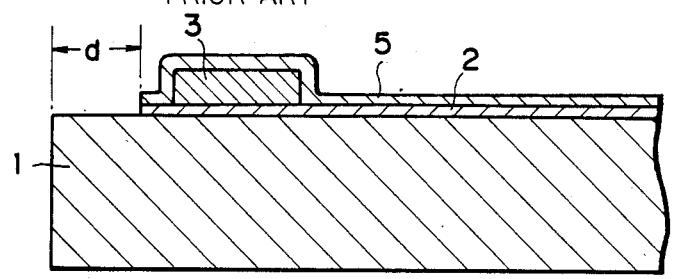
Figure 8:
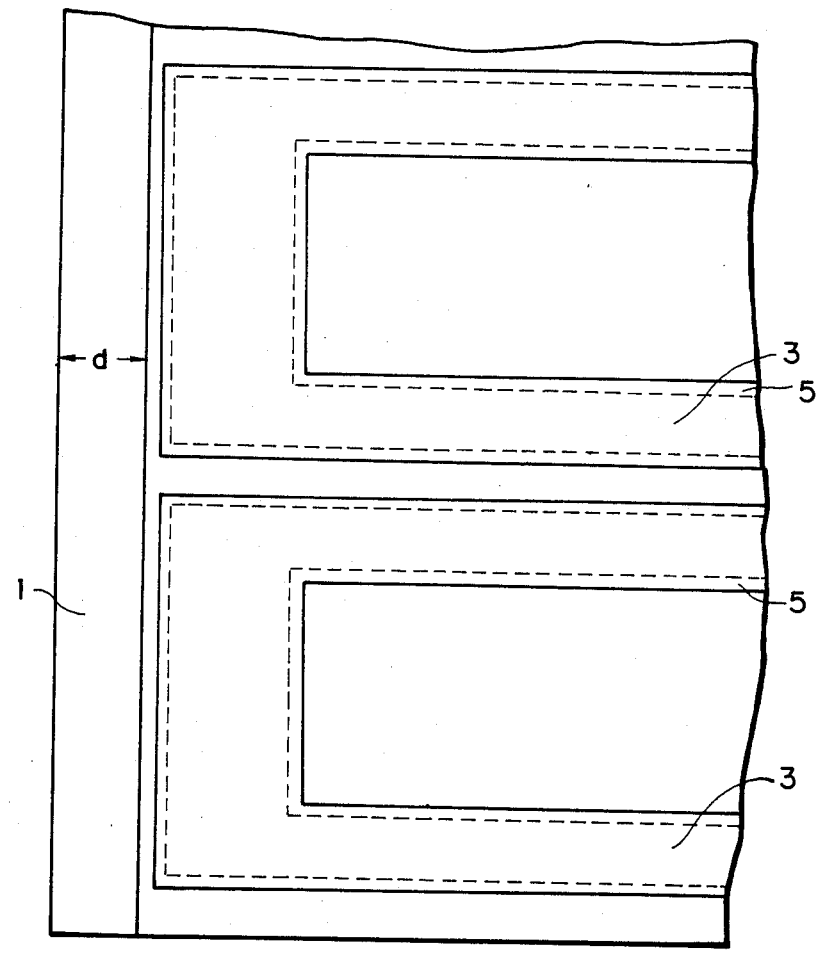
FIG. 8 is a plan view illustrating an example of manufacturing process of the magnetic head in FIG. 1.
Figure 9:
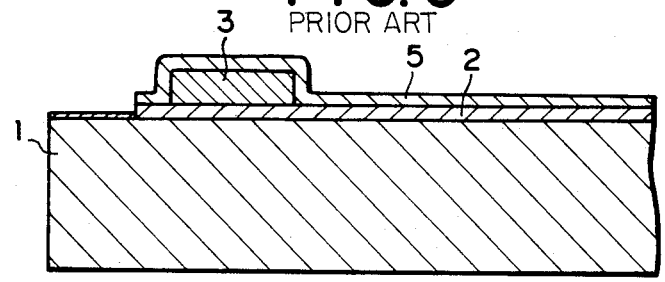
Figure 10:
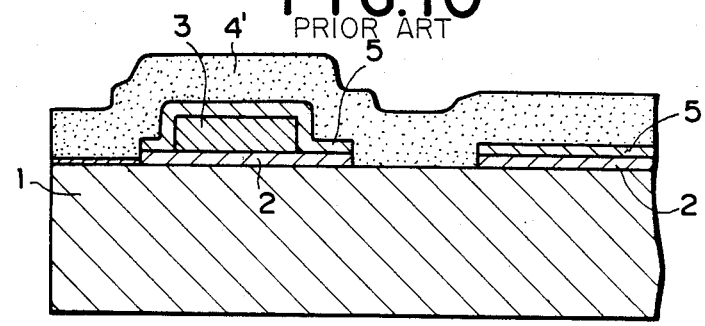
Figure 11:
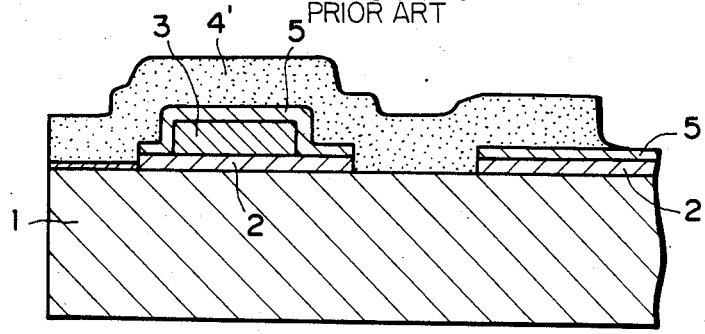
Figure 12:
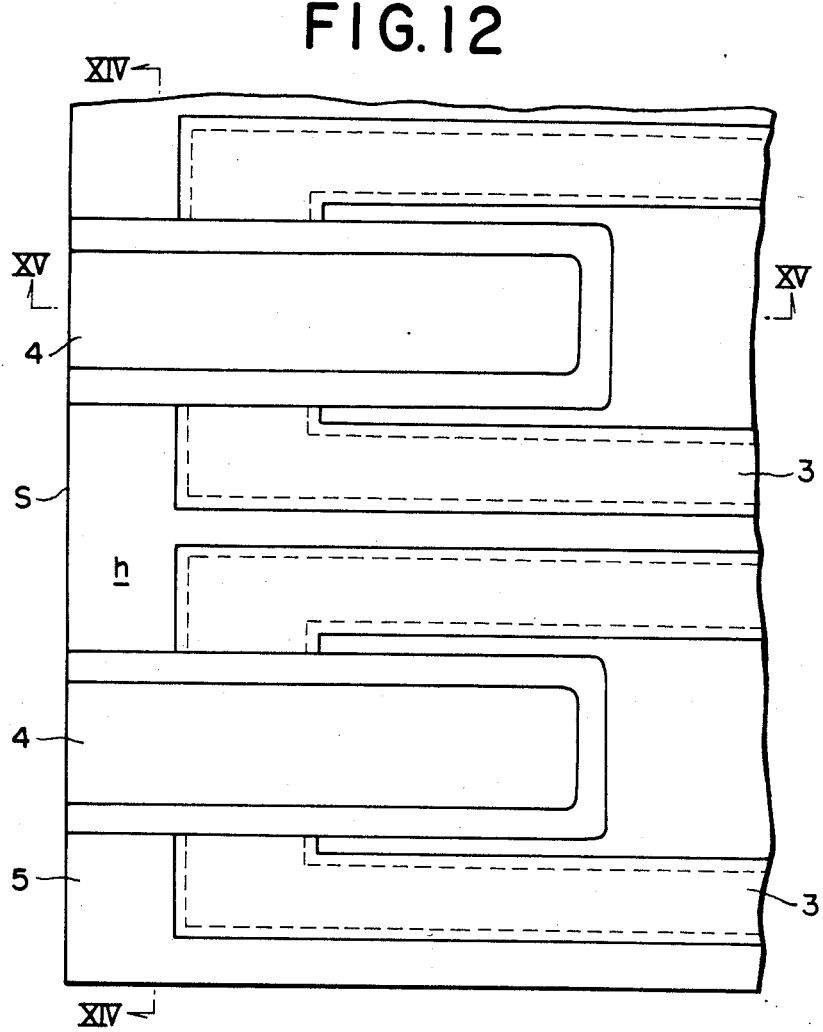
FIG. 12 is a plan view of a multi channel thin film type magnetic head as an embodiment of the invention.
Figure 13:
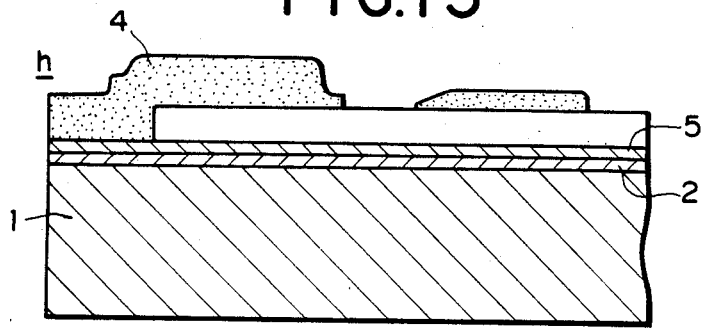
FIG. 13 is a side view of the magnetic head in FIG. 12.
Figure 14:
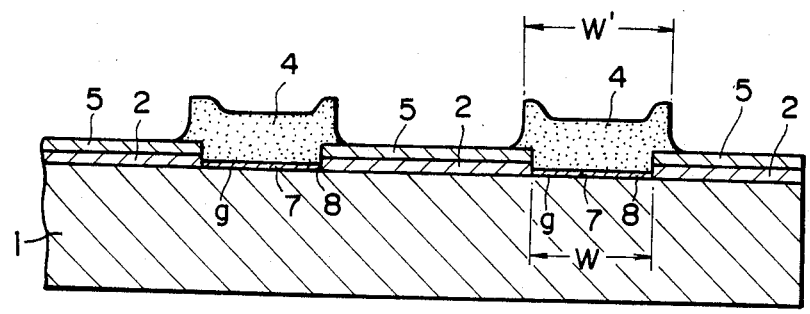
FIG. 14 is a sectional view taken in line XIV—XIV of FIG. 12.
Figure 15:
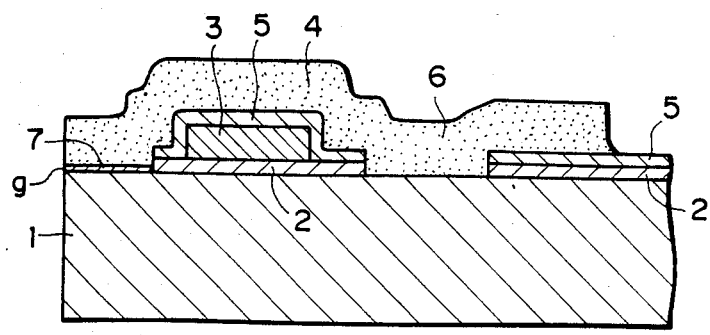
FIG. 15 is a sectional view taken in line XV—XV of FIG. 12.

A multi channel magnetic transducer head as an embodiment of the invention will now be described referring to the accompanying drawings. FIG. 12 is a plan view of an embodiment; FIG. 13 is a side view of FIG. 12; FIG. 14 is a sectional view taken in line XIV—XIV of FIG. 12; and FIG. 15 is a sectional view taken in line XV—XV of FIG. 12. In these figures, parts corresponding to FIGS. 1 through 4 are desingnated by like numerals and detailed description thereof shall be omitted.

Figure 16:
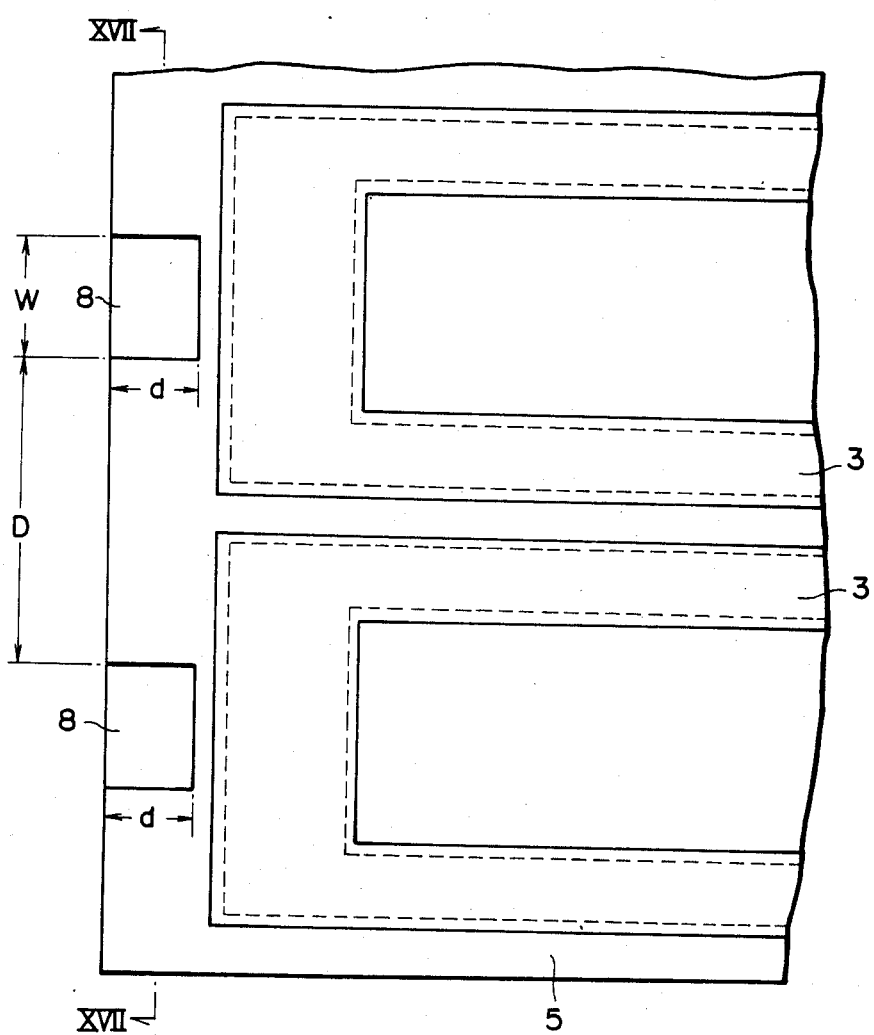
FIG. 16 is a plan view illustrating an example of manufacturing process of the magnetic head in FIG. 12.
Figure 17:
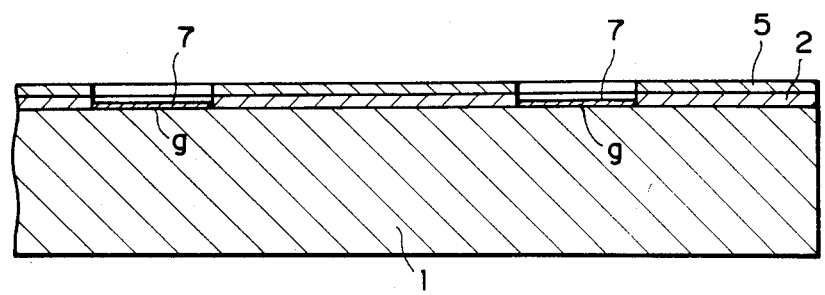
FIG. 17 is a sectional view illustrating an example of manufacturing process of the magnetic head in FIG. 12.

The multi channel magnetic transducer head in the embodiment is manufactured in process similar to that described referring to FIGS. 5 through 11. In the embodiment, however, pattern of selective removing of the insulation films 2 and 5 for the formation of the gap spacer layer 7 is different from that of the prior art shown in FIGS. 7 through 9. As shown in a plan view of FIG. 16 and a sectional view of FIG. 17 taken in line XVii–XVii of FIG. 16, in the embodiment, part of the insulation films 2 and 5, where the gap spacer layer 7 is to be formed, is removed by etching using a photolithography, thereby particularly the removed portion 8 is formed in each track. Width W of the removed portion 8 is selected to width of the track and depth d of the portion 8 is selected to the gap depth. Distance D between the removed portions 8 is selected to the distance between the tracks. The gap spacer layer 7 with predetermined thickness, i.e. thickness corresponding to gap length of the magnetic gap g, is formed at least within the removed portion 8. The magnetic thin film 4' is formed on whole surface including that on the gap spacer layer 7 within the removed portion 8, and then patterning is performed by etching using a photolithography so as to form the thin film magnetic core shown in FIGS. 12 through 15. In this case, particularly width W' of the thin film magnetic core 4 is selected larger than width W of the removed portion 8 as shown in FIG. 14, so that the magnetic core 4 is formed on surface including that on the removed portion 8 at least. Furthermore, the magnetic core 4 extends over a non-magnetic layer which is formed by lamination of the insulation films 2 and 5 outside the removed portion 8 and has sufficiently large thickness in comparison to the gap spacer 7. In this case, since the insulation films as a whole have thickness sufficiently larger than that of the gap spacer layer 7 but less than that of the magnetic thin film 4' to constitute the thin film magnetic core 4, it is noticed that the selective etching is performed at high accuracy without producing the side etching.

In the thin film type multi track magnetic transducer head in such constitution, since the required thin gap spacer layer 7 is formed limitatively on the removed portion 8 of the insulation films 2 and 5, track width of the magnetic gap g formed between the thin film magnetic core 4 on the gap spacer layer 7 and the magnetic substrate 1 is specified precisely by the width W of the removed portion 8. That is, in portion of the thin film magnetic core 4 extending outside the removed portion 8, substantially thick non-magnetic layer exists on account of lamination of the insulation films 2 and 5 and therefore the magnetic gap to the magnetic medium scarcely acts here. Consequently, even if the side etching is produced during the patterning of the magnetic thin film 4' and the trailing portions a and b exist in the magnetic core 4, the track width of the gap g does not become inaccurate and variation does not occur.

Although, in the above-mentioned embodiment, the insulation films 2 and 5 are removed and the removed portion 8 is formed and then the gap spacer 7 is formed on the removed portion 8, the insulation films 2 and 5 may be partly removed by thickness corresponding to part of the lamination thickness and the gap spacer layer 7 may be formed using the residual thickness.

In the-above embodiment also, in place of etching used in the manufacturing process to form the thin film magnetic core 4 in predetermined shape, lift-off method may be used.

Although application to the magnetic transducer head of electromagnetic induction type is disclosed in the above embodiment, the invention can be applied also to the magnetic transducer head of magnetoresistance effect type.

What is claimed is:

1. A multi channel magnetic transducer head comprising:

a magnetic substrate having a flat planar surface and a contact surface adjacent to and substantially perpendicular to said planar surface forming a contact surface for a traveling magnetic recording medium, an insulating layer formed on said flat planar surface, a plurality of magnetic cores formed over said insulating layer forming a plurality of closed magnetic paths with said magnetic substrate, a plurality of conductors, each being coupled to each of said magnetic paths to form a plurality of magnetic transducer head elements, said insulating layer having a plurality of gap portions ands spacing portions each aligned along said contact surface, said spacing portions being located between each of said gap portions, said insulating layer at each of said gap portions having a first thickness corresponding to a gap length of each of said magnetic transducer head elements, said insulating layer at each of said spacing portions having a second thickness larger than said first thickness, and each of said magnetic cores being located on each of said gap portions and partly overlapping adjacent spacing portions so that the track width of each of said magnetic transducer heads is defined by the width of said gap portion facing said contact surface.

* * * * *